R. T. WOOD.
COFFEE POT.
APPLICATION FILED MAY 21, 1915.
1,165,480.
Patented Dec. 28, 1915.
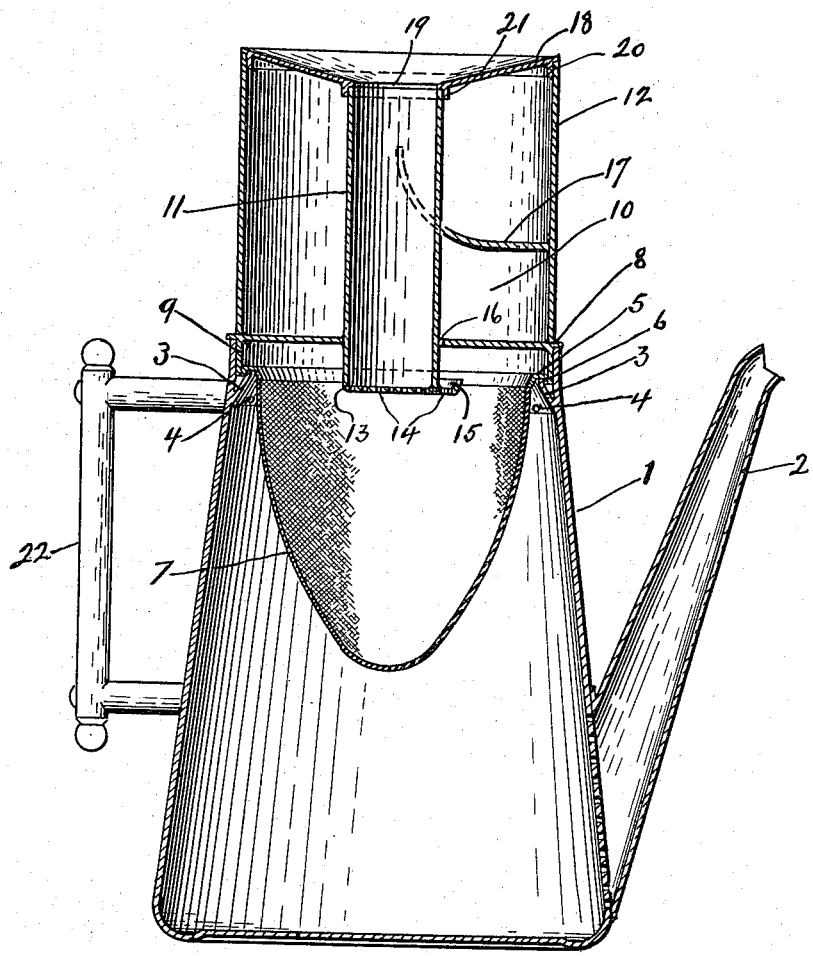
Fig. I.
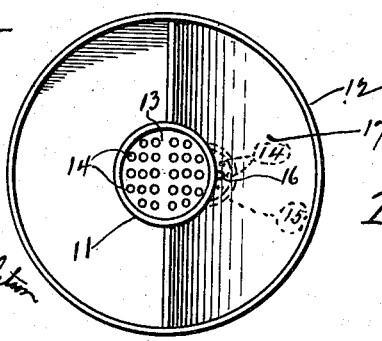
Fig. II.
WITNESSES:
INVENTOR
Robert T. Wood.
BY
M. C. Gillham
ATTORNEY

UNITED STATES PATENT OFFICE.

ROBERT T. WOOD, OF KANSAS CITY, MISSOURI.

COFFEE-POT.

1,165,480.

Specification of Letters Patent.

Patented Dec. 28, 1915.

Application filed May 21, 1915. Serial No. 29,505.

*To all whom it may concern:*

Be it known that I, ROBERT T. WOOD, a citizen of the United States, residing at Kansas City, in the county of Jackson and State of Missouri, have invented a new and useful Improvement in Coffee-Pots, of which the following is a specification.

My invention relates to improvements in coffee pots in which the steam vapor is retained and condensed within the pot, and the objects of my invention are: First: to provide a cold water compartment above the pot which shall operate to condense the steam vapor within the pot and having a diminutive outlet through which a limited quantity of cold water will gravitate to form a pendant sheet of water adapted to prevent escape of steam vapor from the pot. Second: to provide a perforated bottom for the tube through which boiling water is passed into the pot having a perforated extension at one side adapted for a catch-basin for the flow of cold water to prevent its dropping directly into the pot and for deflecting the cold water to the undersides of the perforated bottom of the tube, and, third: to provide a dam within the forward portion of the cold water compartment to stop the water from flowing out at the top of the compartment when the pot is tilted forwardly to pour its contents. I attain these objects by the construction illustrated in the accompanying drawing, in which—

Figure 1. is a sectional view of the coffee pot and its cover and showing my invention, and, Fig. 2. is a plan view of the cover with the lid removed and showing parts of my invention.

Similar numerals of reference refer to corresponding parts throughout the several views:

The numeral 1, indicates a coffee pot of the customary type having a spout 2, communicating with the pot substantially at the bottom thereof and extending upwardly to and a little beyond the top of the pot proper and inclined outwardly so that the spout will approximately be positioned forwardly of the pot, preferably, about two and one half inches. An upwardly extending inwardly inclined annular flange 3, is secured on the inner side of the pot adjacent its top edge, and is provided with a plurality of perforations 4, adapted for the passage therethrough of water which shall occupy the space rearwardly of the flange. A metal ring 5, having a depending flange 6, and provided with a depending cone-shaped sack 7, made of fabric of suitable texture adapted to hold ground coffee and to admit of the passage therethrough of water, is lodged on the flange 3. Although I show the sack depending to about midway the height of the pot it is understood that it may depend to adjacent the bottom thereof. A cover 8, having a depending annular flange 9, in frictional engagement with the inner side of the pot proper is lodged on the top of the latter. The cover is formed with a vertically extending cylindrical cold water compartment 10, the floor of which is formed by the upper side of the cover 8. A tube 11, is extended vertically through the cover 8, and the compartment 10, to adjacent the top of the casing 12. A plate 13, having perforations 14 apertured therein is secured crosswise on the inner end of the tube 11, so that one end thereof shall project forwardly of the tube at the forward side thereof, and the projection is bent upwardly to form a catch basin 15. A diminutive outlet 16, is formed in the bottom of the compartment 10, at the forward side of the tube 11, and is adapted for providing opportunity for the cold water in the compartment to gravitate in limited quantity along the adjacent side of the tube 11 to the catch-basin 15, whence it is conducted through the perforations 14 in the catch-basin to the under side of plate 13, and prevented from dripping directly into the sack 7 as hereinafter fully explained. A dam 17 is formed on the inner side of the compartment 10, a distance upwardly from its bottom and is extended inwardly and upwardly to opposite sides of tube 11, for the purpose of preventing the cold water in the compartment from flowing to the forward side thereof and escaping therefrom at the lid when the pot is tilted to pour the contents of the pot proper. A lid 18, formed concave and having centrally an opening 19 registering with the interior of the tube 11 and provided with a depending annular flange 20, adapted to frictionally engage the inner side of the casing 12, and with a similar flange 21, adapted to frictionally engage the outer side of the tube 11, is movably mounted on the top edge of the casing 12, to close the compartment 10. A handle 22, is mounted on the outer side of the pot opposite to the spout 2.

The construction above described provides means for making instantaneous liquid coffee without loss of aromatic vapor incident to the process of brewing coffee and thereby recovering and retaining in liquid form the beneficial extracts of the coffee berry which otherwise would be wasted. The provision of the dam in the water compartment operates to prevent leakage and facilitates the sanitary cleansing of the compartment to prevent rust and corrosion.

To operate my invention a desired quantity of ground coffee is deposited in the sack 7, and the sack suspended from the flange 3. The cover 8, carrying the superstructure hereinabove described is lodged in position on the pot proper. A quantity of cold water is then poured into the compartment 10, preferably, sufficient to bring the level of the water a little distance below the juncture of the dam 17 with the casing 12. This water gravitates in limited quantity through the outlet 16, and along the adjacent side of the tube 11 to the catch-basin 15, and gravitates through the perforations 14 in the basin to and along the lower side of the plate 13, thereby automatically spreading in a sheet and closing the perforations 14 in the plate, the surplusage dripping at intervals into the sack 7. The lid 18 is then placed in position over the compartment 10 and a desired quantity of boiling water is poured through the opening 19 in the lid, which water strikes on the plate 13, and passes in multiple streams therethrough into the sack 7 and percolates the coffee substance in the sack. In this operation the automatic closure of the perforations 14 in the plate 13 is suspended, but immediately the boiling water has passed the cold water stream flows and operates as before described to close the perforations, and thereby preventing the escape of the steam vapors from the pot, the latter rising against the bottom of the cold water compartment 10, are promptly condensed and the condensed water drops into and unites with the liquid at the bottom of the pot. When the liquid coffee is poured the pot is inclined forwardly and the cold water in the compartment 10 moves forwardly against the dam 17, and rises along the face of the dam, thus preventing leakage at the lid. The peculiar formation of the dam 17, allows the passage of fabrics and other cleansing devices to the remote parts of the compartment to keep the parts in sanitary condition and to prevent rust and corrosion of the metal parts.

Having described my invention I claim:

The combination, with the coffee-pot having the depending sack, of the water compartment located above said sack and provided with a diminutive outlet in its floor and with a transversely extending flange secured on its inner side, the inner portion of said flange being bent upwardly to form a bulk-head, and the tube extending vertically through said compartment and provided on its inner end with a transversely extending forwardly projecting plate having a plurality of perforations therein, the projecting portion of said plate being bent upwardly to form a catch-basin below said outlet in the compartment.

ROBERT T. WOOD.

Witnesses:
 BERTHA GEARY,
 THEOPHILUS DAHLSTROM.

Copies of this patent may be obtained for five cents each, by addressing the "Commissioner of Patents, Washington, D. C."